(12) United States Patent
Hatscher et al.

(10) Patent No.: US 7,897,719 B2
(45) Date of Patent: Mar. 1, 2011

(54) CATALYST AND PROCESS FOR THE POLYMERIZATION OF CYCLIC ETHERS

(75) Inventors: Stephan Hatscher, Syke (DE); Michael Hesse, Worms (DE); Tobias Wabnitz, Mannheim (DE); Stefan Kashammer, Schifferstadt (DE); Rolf Pinkos, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 428 days.

(21) Appl. No.: 12/088,208

(22) PCT Filed: Nov. 30, 2006

(86) PCT No.: PCT/EP2006/069095
§ 371 (c)(1),
(2), (4) Date: Mar. 26, 2008

(87) PCT Pub. No.: WO2007/065838
PCT Pub. Date: Jun. 14, 2007

(65) Prior Publication Data
US 2008/0221302 A1    Sep. 11, 2008

(30) Foreign Application Priority Data
Dec. 7, 2005 (DE) .................. 10 2005 058 416

(51) Int. Cl.
*C08G 65/00* (2006.01)
*C08G 65/20* (2006.01)
*B01J 21/16* (2006.01)

(52) U.S. Cl. ............ 528/412; 528/410; 528/485; 528/486; 528/502 R; 528/503; 502/80; 502/81; 502/86

(58) Field of Classification Search ........... 528/410, 528/412, 485, 486, 502 R, 503; 502/80, 502/81, 86
See application file for complete search history.

(56) References Cited

U.S. PATENT DOCUMENTS

| 4,189,566 A | 2/1980 | Mueller et al. |
| 5,268,345 A | 12/1993 | Mueller |
| 5,344,964 A | 9/1994 | Chu et al. |
| 6,274,527 B1 | 8/2001 | Belbachir et al. |
| 7,186,395 B2 | 3/2007 | Walsdorff et al. |
| 2006/0046925 A1 | 3/2006 | Schlitter et al. |

FOREIGN PATENT DOCUMENTS

| DE | 28 01 578 A | 7/1979 |
| DE | 101 54 718 A | 5/2003 |
| DE | 102 45 198 | 4/2004 |
| EP | 0 012 534 | 6/1980 |
| EP | 0 535 515 | 4/1993 |
| EP | 0 925 829 | 6/1999 |

OTHER PUBLICATIONS

Klockmanns, "Lehrbuch der Mineralogie," 16th Edition, F. Eucke, 1978, pp. 739-765.
*Handbook of Heterogeneous Catalysis*, vol. 1, VCH Weinheim, 1997, pp. 414-417.
Shrigadi et al., "Study of catalytic activity of free and K10-supported iron oxyhydroxides and oxides in the Friedel-Crafts benzylation reaction using benzyl chloride/alcohol to understand their role in the catalysis by the Fe-exchanged /impregnated K10 catalysts," *Applied Catalysis A: General*, Elsevier Science, vol. 252, No. 1, 2003, pp. 23-35.
Diaz et al., "Spectroscopic Study of CuO/CoO Catalysts Supported by Si-Al-Y Zeolite Matrices Prepared by Two Sol-Gel Methods," *Journal of Sol-Gel Science and Technology*, Springer, vol. 17, No. 2, 2000, pp. 137-144.
Mishra et al., "Transition metal oxide pillared clay: 5. Synthesis, characterisation and catalytic activity of iron-chromium mixed oxide pillared montmorillonite," *Applied Catalysis, A: General*, Elsevier Science, vol. 174, No. 1-2, 1998, pp. 91-98.
International Search Report for International Application PCT/EP2006/069095 dated Feb. 21, 2007.

*Primary Examiner* — Duc Truong
(74) *Attorney, Agent, or Firm* — Connolly Bove Lodge & Hutz LLP

(57) ABSTRACT

The present invention provides a catalyst comprising a mixture of at least one acid-activated sheet silicate with a transition metal oxide of groups 8 and/or 9 of the Periodic Table of the Elements and also a process for preparing polytetrahydrofuran, polytetrahydrofuran copolymers, diesters or monoesters of these polymers, in which tetrahydrofuran is polymerized in the presence of at least one telogen and/or comonomer over such a catalyst.

20 Claims, No Drawings

CATALYST AND PROCESS FOR THE POLYMERIZATION OF CYCLIC ETHERS

This application is a national phase of PCT/EP2006/069095, filed Nov. 30, 2006, which claims priority to DE 102005058416.0, filed Dec. 7, 2005, the entire contents of all are hereby incorporated by reference.--

DESCRIPTION

The present invention relates to an improved catalyst comprising a mixture of at least one acid-activated sheet silicate with a transition metal oxide of groups 8 and/or 9 of the Periodic Table of the Elements and also to a process for preparing polytetrahydrofuran, polytetrahydrofuran copolymers, diesters or monoesters of these polymers, in which tetrahydrofuran is polymerized in the presence of at least one telogen and/or comonomer over such a catalyst.

Polytetrahydrofuran (hereinafter referred to as "PTHF"), also known as polyoxybutylene glycol, is a versatile intermediate in the plastics and synthetic fibrous industry and is used, inter alia, as diol component for preparing polyurethane, polyester and polyamide elastomers. In addition, it, like some of its derivatives, is a valuable auxiliary in many applications, e.g. as dispersant or in the deinking of wastepaper.

PTHF is usually prepared industrially by polymerization of tetrahydrofuran (hereinafter referred to as "THF") over suitable catalysts in the presence of reagents whose addition makes it possible to control the length of the polymer chains and thus to set the mean molecular weight (chain termination reagents or "telogens"). The control is effected by choice of type and amount of the telogen. Functional groups can be additionally introduced at one or both ends of the polymer chain by selection of suitable telogens.

Thus, for example, the monoesters or diesters of PTHF can be prepared by use of carboxylic acids or carboxylic anhydrides as telogens. Only after subsequent hydrolysis or transesterification is PTHF itself formed. This preparation is therefore referred to as the two-stage PTHF process.

Other telogens not only act as chain termination reagents but are also incorporated into the growing polymer chain of PTHF. They not only have the function of a telogen but at the same time act as a comonomer and can therefore be referred to as telogens and comonomers with equal justification. Examples of such comonomers are telogens having two hydroxy groups, e.g. dialcohols. These can be, for example, ethylene glycol, propylene glycol, butylene glycol, 1,3-propanediol, 1,4-butanediol, 2-butyne-1,4-diol, 2,2-dimethyl-1,3-propanediol, 1,6-hexanediol or low molecular weight PTHF.

Further suitable comonomers are cyclic ethers, preferably three-, four- and five-membered rings such as 1,2-alkylene oxides, e.g. ethylene oxide or propylene oxide, oxetane, substituted oxetanes such as 3,3-dimethyloxetane and also THF derivatives such as 3-methyltetrahydrofuran, 3,3-dimethyltetrahydrofuran or 3,4-dimethyltetrahydrofuran.

The use of such comonomers or telogens leads, with the exception of water, 1,4-butanediol and low molecular weight PTHF, to the formation of tetrahydrofuran copolymers, hereinafter referred to as THF copolymers, and in this way makes it possible to modify PTHF chemically.

Industrially, PTHF can be prepared in a single stage by polymerization of THF using water, 1,4-butanediol or low molecular weight PTHF as telogen over acid catalysts. Known catalysts are both homogeneous systems dissolved in the reaction system and heterogeneous, i.e. largely undissolved, systems. However, a disadvantage is the relatively low THF conversions which are achieved, especially in the synthesis of PTHF having a molecular weight of from 650 to 3000.

On an industrial scale, it is predominantly the above-mentioned two-stage processes which are carried out, with THF firstly being polymerized, for example, in the presence of fluorosulfonic acid to form polytetrahydrofuran esters and these are subsequently hydrolyzed to PTHF. This form of the THF polymerization usually gives higher THF conversions than do single-stage processes. The polymerization of THF in the presence of carboxylic anhydrides such as acetic anhydride in the presence of acid catalysts to form PTHF diacetates and subsequent transesterification of the PTHF diacetates with, for example, methanol to give PTHF and methyl acetate is especially advantageous.

The preparation of PTHF by polymerization of THF in the presence of carboxylic anhydrides or the preparation of THF copolymers by polymerization of THF in the presence of carboxylic anhydrides and cyclic ethers as comonomers over acidic clay minerals which is preferred in the patent application is known.

Thus, DE-A-28 01 578 describes a process for preparing PTHF diacetates from THF in the presence of carboxylic anhydrides and a bleaching earth having a water content of <3% by weight as catalyst.

In DE-A-198 01 462, acid-activated calcium montmorillonites in powder or extrudate form are used as catalysts for THF polymerization to give, inter alia, PTHF diacetates.

U.S. Pat. No. 6,274,527 discloses a catalyst based on acid-activated Algerian bentonites. The specific raw clay is activated with sulfuric acid having a concentration of 0.1-0.9 mol/l for up to 3 days at room temperature or 1-2 h at elevated temperatures, filtered, washed and dried.

Processes for producing acid-activated clay minerals, in particular sheet silicates, are likewise known. An overview is given in EP 398 636 and the publications cited therein. Acid-activated bentonites are used on a large scale as bleaching earths for the decolorization of oils.

The catalysts known from the prior art display only a relatively low activity, which in an industrial plant leads to very large reactor volumes and/or very long reaction times. The economics of a heterogeneously catalyzed process for polymerizing cyclic ethers, in particular THF, therefore depend critically on the productivity of the catalyst. It was therefore an object of the present invention to provide a highly active catalyst for the preparation of polytetrahydrofuran, polytetrahydrofuran copolymers, diesters or monoesters of these polymers.

According to the invention, the object is achieved by a catalyst comprising a mixture of at least one acid-activated sheet silicate with a transition metal oxide of groups 8 and/or 9 of the Periodic Table of the Elements.

Suitable transition metal oxides of groups 8 and/or 9 (new IUPAC nomenclature, group VIIIA according to the old nomenclature) of the Periodic Table of the Elements are, in particular, the oxides of cobalt and of iron, particularly preferably iron(III) oxide and cobalt(II, III) oxide ($Co_3O_4$). Very particular preference is given to iron(III) oxide, which has been pretreated as described in DE-A 101 54 718, i.e. has been calcined at a temperature of from 700 to 1200° C., before use. A very particularly suitable iron(III) oxide is marketed by Thyssen-Krupp under the trade name type HP (Hösch Premium). The catalyst of the invention comprises from 0.5 to 10% by weight, preferably from 0.5 to 5% by weight, particularly preferably from 3 to 4% by weight. Iron(III) oxide is particularly preferably comprised in an amount of 0.5 or from 3 to 4% by weight, based on the sheet silicate. Cobalt(II, III)

oxide is preferably comprised in an amount of from 0.5 to 5% by weight, based on the sheet silicate.

As acid-activated sheet silicate, it is possible to use commercial acid-activated bleaching earths. Examples are activated clay minerals of the montmorillonite-saponite group or palygorscite-sepiolite group, particularly preferably montmorillonites as are described, for example, in Klockmanns Lehrbuch der Mineralogie, 16th edition, F. Euke Verlag 1978, pages 739-765. Montmorillonite-comprising materials are also referred to as bentonites or sometimes as fuller's earths.

Suitable sources of the sheet silicate are in principle all montmorillonite-comprising deposits as are mentioned, for example, in "The Economics of Bentonite", $8^{th}$ Edition 1997, Roskill Information Services Ltd, London. The raw clays often comprise not only montmorillonite but also further mineral and nonmineral constituents. Mineral constituents which can be comprised are, for example, quartz, feldspar, kaolin, muscovite, zeolites, calcite and/or gypsum in various amounts.

Preferred sheet silicates have a high montmorillonite content and correspondingly a low content of secondary constituents. The montmorillonite content can be determined by determination of the methylene blue adsorption by the spot method as described in the methods "Bindemittelprüfung/ Prüfung von Bindetonen" of the Verein Deutscher Giessereifachleute (VDG, version P 69 E of June 1998); preferred raw materials display a methylene blue value of >250 mg/g, preferably >290 mg/g, in particular >320 mg/g. Particularly preferred sheet silicates are ones in which a high percentage of the exchangeable cations are alkali metals, in particular sodium. Based on charge equivalents, these raw materials comprise >25%, preferably >40%, of monovalent exchangeable cations.

These sodium bentonites as raw materials occur naturally. Known sources of sodium-comprising bentonites are located, for example, in Wyoming/USA or in India, and they are also known, depending on their origin, as "Western Bentonites", "Wyoming bentonites" or according to their properties as "swelling bentonites". Bentonites having a high proportion of alkaline earth metal cations, in particular calcium, are known as, for example, "Subbentonites" or "Southern Bentonites" and can be converted by alkaline activation into sodium-comprising bentonites. Such alkaline-activated raw materials are also suitable for catalysts according to the invention. Finally, it is in principle also possible to produce suitable raw materials synthetically.

Sheet silicates of natural origin sometimes also comprise nonmineral impurities, in particular carbon compounds. As catalyst raw material, preference is given to bentonites which have a total carbon content of <3%, preferably <1%, particularly preferably <0.5%.

The sheet silicate is acid-activated for production of the catalyst of the invention. For this purpose, the sheet silicate either in the form of granules or shaped bodies or in powder form is treated with mineral acids such as hydrochloric, sulfuric or nitric acid in a manner known per se. Activation in organic acids such as formic or acetic acid is also possible.

Sheet silicates, also referred to as clay minerals, which have been acid-activated by the manufacturer are marketed, for example, by Südchemie under the name "K10" or "KSF" or "Tonsil".

The catalyst of the invention is obtained by mixing of the transition metal oxide with the acid-activated sheet silicate and, if appropriate, subsequent shaping. For this purpose, transition metal oxide and acid-activated sheet silicate are combined and briefly dry mixed in a mixing unit, for example a Mixmuller or a pan mill. If the catalyst is to be used as shaped bodies, for example as extrudate or pellet, water and binder are added and the mixture is shaped by means of suitable pressing or shaping apparatuses. The production of shaped bodies from pulverulent raw materials is known per se and can be carried out by, for example, tableting, agglomeration or extrusion, as described, inter alia, in the Handbook of Heterogenous Catalysis, Vol. 1, VCH Verlagsgesellschaft Weinheim, 1997, pp. 414-417. Auxiliaries known to those skilled in the art, e.g. binders, lubricants, pore formers and/or solvents, can be added during shaping.

The catalyst can, in a preferred embodiment, be processed directly by addition of a solvent such as water, dilute mineral acids, aqueous acid solutions or organic solvents without the use of binders, lubricants or pore formers.

The catalyst is generally dried at temperatures of from 30° C. to 200° C. and atmospheric pressure, but can also be dried under reduced pressure. The catalyst can subsequently be calcined at temperatures of from 150° C. to 800° C., preferably from 250° C. to 600° C.

The catalysts of the invention can be used, for example, in the form of pellets, extrudates, spheres, rings or crushed material for the polymerization. Pellets, extrudates or spheres are preferably used as shaped bodies. In the case of spheres, diameters of from 0.1 to 10 mm, preferably from 0.3 to 5 mm, are utilized. Pellets used preferably have diameters of from 1 to 5 mm and heights of from 1 to 3 mm. In the case of extrudates, use is made of ones having a diameter in the range from 0.5 to 4 mm, preferably from 1 to 3 mm. The ratio of length to diameter of preferred extrudates is usually from 20:1 to 0.5:1, preferably from 5:1 to 1:1. In the case of cylindrical extrudates, it is also possible to use, for example, hollow extrudates, ribbed extrudates, star extrudates or other extrudate shapes known to those skilled in the art.

A possible pretreatment of the catalyst before use in the polymerization reaction is, for example, drying by means of inert gases, e.g. air or nitrogen, which have been heated to from 80 to 200° C., preferably from 100 to 150° C.

Suitable telogens in the preparation of PTHF esters are carboxylic anhydrides and/or carboxylic anhydride/carboxylic acid mixtures. Among these, aliphatic and aromatic polycarboxylic and/or monocarboxylic acids and anhydrides thereof comprising from 2 to 12 carbon atoms are preferred. Examples of preferred telogens are acetic anhydride, propionic anhydride, succinic anhydride and maleic anhydride, if appropriate in the presence of the corresponding acids. Particular preference is given to acetic anhydride as telogen.

The PTHF acetates formed when the preferred telogens are used can be converted into PTHF by various methods (e.g. as indicated in U.S. Pat. No. 4,460,796).

Other copolymers of THF can be prepared by additional use of cyclic ethers which can be polymerized with opening of the ring, preferably three-, four- and five-membered rings such as 1,2-alkylene oxides, e.g. ethylene oxide or propylene oxide, oxetane, substituted oxetanes such as 3,3-dimethyloxetane and also THF derivatives such as 3-methyltetrahydrofuran, 3,3-dimethyltetrahydrofuran or 3,4-dimethyltetrahydrofuran, with 3-methyltetrahydrofuran being particularly preferred.

The telogen and, if desired, the comonomer are advantageously introduced into the polymerization as solutions in THF. Since the telogen leads to chain termination or chain transfer in the polymerization, the mean molecular weight of the polymer can be controlled via the amount of telogen used. The more telogen comprised in the reaction mixture, the lower does the mean molecular weight of the PTHF or the respective PTHF derivative become. Depending on the telogen content of the polymerization mixture, it is possible to prepare PTHF, the respective PTHF derivatives or THF copolymers having mean molecular weights of from 250 to 10000 dalton in a targeted manner. The process of the invention is preferably used to prepare PTHF, the respective PTHF derivatives or THF copolymers having mean molecular weights of from 500 to 5000 dalton, particularly preferably from 650 to 4000 dalton.

The polymerization is generally carried out at temperatures of from 0 to 80° C., preferably from 25° C. to the boiling point of THF. The pressure employed is generally not critical for the result of the polymerization, which is why the polymerization is generally carried out at atmospheric pressure or under the autogenous pressure of the polymerization system. Exceptions are copolymerizations of THF with the volatile 1,2-alkylene oxides, which are advantageously carried out under superatmospheric pressure. The pressure is usually from 0.1 to 20 bar, preferably from 0.5 to 2 bar.

To avoid formation of ether peroxides, the polymerization is advantageously completed under an inert gas atmosphere. Inert gases which can be used are, for example, nitrogen, carbon dioxide or the noble gases, with preference being given to using nitrogen.

It is particularly advantageous to carry out the polymerization under a hydrogen atmosphere. This embodiment gives a particularly low color number of the polymers formed. The hydrogen partial pressure can be selected in the range from 0.1 to 50 bar. Doping of the polymerization catalyst with transition metals or mixing of the polymerization catalyst with a catalyst comprising transition metal enables the color number to be improved still further in a polymerization carried out in the presence of hydrogen. Suitable transition metals are the elements of groups 7 to 10 of the Periodic Table, for example ruthenium, rhenium, nickel, iron, cobalt, palladium and/or platinum.

The process of the invention can be operated batchwise or continuously, with the continuous mode of operation generally being preferred for economic reasons.

In the batchwise mode of operation, the reactants THF, the respective telogen and/or, if desired, the comonomer and the catalyst are generally reacted in a stirred vessel or loop reactor at the temperatures indicated until the desired conversion of the THF has been achieved. Depending on the amount of catalyst added, the reaction time can be from 0.5 to 40 hours, preferably from 1 to 30 hours. The catalysts are generally added to the polymerization mixture in an amount of from 1 to 90% by weight, preferably from 4 to 70% by weight and particularly preferably from 8 to 60% by weight, based on the weight of the THF used.

In the continuous mode of operation, the reaction can be carried out in the suspension or fixed-bed mode in conventional reactors or reactor arrangements suitable for continuous processes, in the case of the suspension mode, for example, in loop reactors or stirred reactors and in the case of the fixed-bed mode in tube reactors or fixed-bed reactors, with the fixed-bed mode being preferred.

In the preferred fixed-bed mode, the polymerization reactor can be operated in the upflow mode, i.e. the reaction mixture is conveyed from the bottom upward, or in the downflow mode, i.e. the reaction mixture is conveyed through the reactor from the top downward. The starting mixture (feed) of THF and telogen and/or comonomer is fed continuously into the polymerization reactor at a space velocity over the catalyst of from 0.01 to 2.0 kg of THF/(l*h), preferably from 0.02 to 1.0 kg of THF/(l*h) and particularly preferably from 0.04 to 0.5 kg of THF/(l*h).

Furthermore, the polymerization reactor can be operated in a single pass, i.e. without product recirculation, or in the recycle mode, i.e. part of the polymerization mixture leaving the reactor is circulated. In the recycle mode, the ratio of recycle to feed is less than or equal to 150:1, preferably less than 100:1 and preferably less than 60:1.

The concentration of the carboxylic anhydride used as telogen in the starting mixture fed to the polymerization reactor is in the range from 0.03 to 30 mol %, preferably from 0.5 to 20 mol %, particularly preferably from 1 to 12 mol %, based on the THF used.

If a carboxylic acid is additionally used, the molar ratio in the feed is usually from 1:20 to 1:20000, based on carboxylic anhydride used.

If additional comonomers are used, the molar ratio in the feed is usually from 0.1 to 60 mol %, preferably from 0.5 to 50 mol %, particularly preferably from 2 to 40 mol %, based on THF used.

If the polymerization has been carried out in the suspension mode, it is necessary, for the work-up of the polymerization product mixture, to separate off the major part of the polymerization catalyst, for example by filtration, decantation or centrifugation, from the polymerization mixture and to pass the resulting polymerization product mixture to further work-up. In the preferred fixed-bed mode, the polymerization product mixture is directly worked up further.

The work-up of the particularly preferred PTHF acetates or THF copolymer acetates can be carried out by methods known per se. For example, unreacted THF and any acetic anhydride, acetic acid and comonomer are separated off by distillation and the PTHF acetate or THF copolymer acetate obtained is transesterified with methanol in the presence of a basic catalyst to give PTHF or THF copolymer and methyl acetate.

If desired, low molecular weight PTHF and/or tetrahydrofuran copolymer having a mean molecular weight of from 200 to 700 dalton can subsequently be separated off by distillation. Low molecular weight cyclic oligomers can also usually be separated off by distillation here. PTHF or THF copolymer having a mean molecular weight of from 650 to 10000 dalton is left as distillation residue.

The catalysts of the invention can be regenerated after use in a PTHF process operated batchwise or continuously, for example by heat treatment as described in EP-A-0 535 515 and/or by washing of the catalyst with aqueous and/or organic solvents.

EXAMPLES

Example 1

201.2 g of activated bleaching earth K10 from Südchemie were mixed with 1.01 g (corresponding to 0.5% by weight) of $Fe_2O_3$ from Thyssen-Krupp, type HP, in a pan mill and processed with 0.75 ml of water per gram of dry material to produce extrudates, dried at 120° C. and subsequently calcined at 450° C.

Example 2

196.1 g of activated bleaching earth K10 from Südchemie were mixed with 6.1 g (corresponding to 3% by weight) of $Fe_2O_3$ from Thyssen-Krupp, type HP, in a pan mill and processed with 0.75 ml of water per gram of dry material to produce extrudates having the same size and shape as in example 1, dried at 120° C. and subsequently calcined at 450° C.

Example 3

194 g of activated bleaching earth K10 from Südchemie were mixed with 8.1 g (corresponding to 4% by weight) of $Fe_2O_3$ from Thyssen-Krupp, type HP, in a pan mill and processed with 0.75 ml of water per gram of dry material to produce extrudates having the same size and shape as in example 1, dried at 120° C. and subsequently calcined at 450° C.

Example 4

99.5 g of activated bleaching earth K10 from Südchemie were mixed with 0.5 g (corresponding to 0.5% by weight) of $Co_3O_4$ from Thyssen-Krupp, type HP, in a pan mill and processed with 0.89 ml of water per gram of dry material to produce extrudates having the same size and shape as in example 1, dried at 120° C. and subsequently calcined at 450° C.

Comparative Example 1

200 g of activated bleaching earth K10 from Südchemie were processed with 0.75 ml of water per gram of dry material in a manner analogous to example 1 to produce extrudates having the same size and shape as in example 1.

Example 5

Continuous Polymerization

In a laboratory apparatus, a mixture of 150 g of THF and 14.8 g of acetic anhydride was, in each case under protective gas, circulated at 1 l/h over 22 g of dried shaped catalyst at 50° C. After 30, 60, 90 and 120 minutes, the index of refraction of the reaction liquid is determined using a refractometer from THG Glock Instruments (DR-122 Refraktometer, Nd 1.3800-1.4535). The initial productivity of the catalyst extrudate is determined by extrapolation of the plot of PTHF diacetate formation versus time.

The results for the abovementioned catalysts are shown in Table 1.

TABLE 1

| Catalyst | Activity in $g_{PTHF}/kg_{cat}/h$ |
|---|---|
| Example 1 | 2.176 |
| Example 2 | 1.633 |
| Example 3 | 1.889 |
| Example 4 | 1.322 |
| Comparative example 1 | 1.244 |

Example 6

Continuous Polymerization 61.5 g/h of THF and 2.5 g/h of acetic anhydride were circulated at 40° C. over 200 ml=about 118 g of the catalyst of example 1 in a tube reactor by means of a pump. The constant recycle:feed ratio was 15:1. Every hour, a further 64 g of the polymerization mixture were introduced into the reactor while the same amount of product mixture was taken from the circuit. To analyze the product mixture, the volatile components of the reaction product mixture, i.e. essentially unreacted THF and acetic anhydride, were evaporated under reduced pressure firstly at 70° C. and 30 mbar and then at 170° C. and 0.3 mbar. The conversion was determined by comparison of the evaporation residue with the starting materials and was found to be 52% (based on the mass of the starting materials).

Comparative Example 2

61.5 g/h of THF and 2.5 g/h of acetic anhydride were circulated at 40° C. over 200 ml of the catalyst of comparative example 1 in a tube reactor by means of a pump. The constant recycle:feed ratio was 15:1. Every hour, a further 64 g of the polymerization mixture were introduced into the reactor while the same amount of product mixture was taken from the circuit. To analyze the product mixture, the volatile components of the reaction product mixture, i.e. essentially unreacted THF and acetic anhydride, were evaporated under reduced pressure firstly at 70° C. and 30 mbar and then at 170° C. and 0.3 mbar. The conversion was determined by comparison of the evaporation residue with the starting materials and was found to be 43% (based on the mass of the starting materials).

The invention claimed is:

1. A process for preparing polytetrahydrofuran, polytetrahydrofuran copolymers, diesters or monoesters of these polymers, wherein tetrahydrofuran is polymerized in the presence of at least one telogen and/or comonomer over a catalyst which is produced by dry mixing of an acid-activated sheet silicate and a transition metal oxide of groups 8 and/or 9 of the Periodic Table.

2. The process according to claim 1, wherein the catalyst is used as a shaped body which is produced by adding water and binder after the dry mixing of the transition metal oxide and the sheet silicate and subsequent shaping by means of shaping apparatuses.

3. The process according to claim 1, wherein the transition metal oxide is comprised in an amount of from 0.5 to 10% by weight, based on the sheet silicate.

4. The process according to claim 1, wherein the transition metal oxide is selected from among iron(III) oxide and cobalt (II, III) oxide.

5. The process according to claim 1, wherein iron oxide is comprised in an amount of 0.5% by weight or from 3 to 4% by weight of iron(III) oxide, based on the sheet silicate.

6. The process according to claim 1, wherein cobalt(II, III) oxide is comprised in an amount of from 0.5 to 10% by weight, based on the sheet silicate.

7. The process according to claim 1, wherein iron(III) oxide which has been calcined at a temperature of from 700 to 1200° C. is used.

8. The process according to claim 1, wherein the acid-activated sheet silicate is selected from the montmorillonite-saponite group or palygorscite-sepiolite group.

9. The process according to claim 8, wherein the acid-activated sheet silicate has a high montmorillonite content corresponding to a methylene blue value of >250 mg/g or consists of montmorillonite.

10. The process according to claim 9, wherein the acid-activated sheet silicate is a bentonite.

11. The process according to claim 10, wherein the bentonite has a total carbon content of less than 3% by weight.

12. The process according claim 2, wherein the transition metal oxide is comprised in an amount of from 0.5 to 10% by weight, based on the sheet silicate.

13. The process according to claim 2, wherein the transition metal oxide is selected from among iron(III) oxide and cobalt(II, III) oxide.

14. The process according to claim 3, wherein the transition metal oxide is selected from among iron(III) oxide and cobalt(II, III) oxide.

15. The process according to claim 2, wherein iron oxide is comprised in an amount of 0.5% by weight or from 3 to 4% by weight of iron(III) oxide, based on the sheet silicate.

16. The process according to claim 3, wherein iron oxide is comprised in an amount of 0.5% by weight or from 3 to 4% by weight of iron(III) oxide, based on the sheet silicate.

17. The process according to claim 4, wherein iron oxide is comprised in an amount of 0.5% by weight or from 3 to 4% by weight of iron(III) oxide, based on the sheet silicate.

18. The process according to claim 2, wherein cobalt(II, III) oxide is comprised in an amount of from 0.5 to 10% by weight, based on the sheet silicate.

19. The process according to claim 3, wherein cobalt(II, III) oxide is comprised in an amount of from 0.5 to 10% by weight, based on the sheet silicate.

20. The process according to claim 4, wherein cobalt(II, III) oxide is comprised in an amount of from 0.5 to 10% by weight, based on the sheet silicate.

* * * * *